United States Patent [19]

Scholle

[11] 4,224,367
[45] Sep. 23, 1980

[54] MULTIPLE PLY PACKAGING MATERIAL COMPRISING OUTER PLIES SEALED AROUND AN INNER PLY

[75] Inventor: William R. Scholle, Corona del Mar, Calif.

[73] Assignee: Scholle Corporation, Northlake, Ill.

[21] Appl. No.: 908,386

[22] Filed: May 22, 1978

[51] Int. Cl.$^2$ .......................... B32B 7/04; B32B 7/14; B32B 25/08; B65D 65/40

[52] U.S. Cl. ................................... 428/76; 206/484.2; 206/819; 229/87 F; 426/126; 426/127; 428/194

[58] Field of Search ................ 426/126, 127; 428/76, 428/194; 206/819, 484.2; 229/87 F

[56] References Cited

U.S. PATENT DOCUMENTS

| | | | |
|---|---|---|---|
| 3,367,785 | 2/1968 | Finucane et al. | 426/126 |
| 3,539,772 | 11/1970 | Eisler | 426/127 |
| 3,934,065 | 1/1976 | Tung | 428/256 |
| 3,949,114 | 4/1976 | Viola et al. | 426/126 |

FOREIGN PATENT DOCUMENTS 2364219  6/1975  Fed. Rep. of Germany .......... 426/126

*Primary Examiner*—James C. Cannon
*Attorney, Agent, or Firm*—Gary, Juettner & Pyle

[57] ABSTRACT

Multiple ply packaging materials formed of an inner ply of substrate material superimposed between outer plies of thermoplastic films exhibit excellent gas barrier properties. The inner ply may comprise any suitable material such as nylon, but for significantly improved gas barrier properties preferably comprises either a plastic film having a metal coating on one or both surfaces thereof, or a metal foil. The inner ply is encapsulated between the outer thermoplastic plies to isolate the inner ply from the contents of the package, especially when the material is exposed to or is employed to package liquids, the outer plies of thermoplastic film being sealed about their edges outwardly from the edges of the inner ply.

11 Claims, 4 Drawing Figures

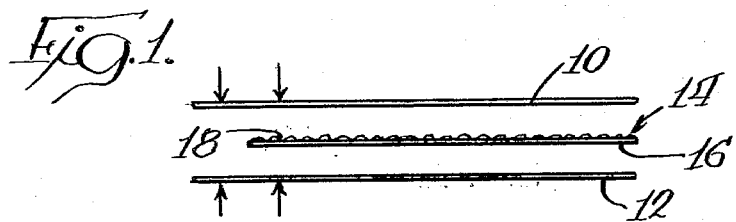
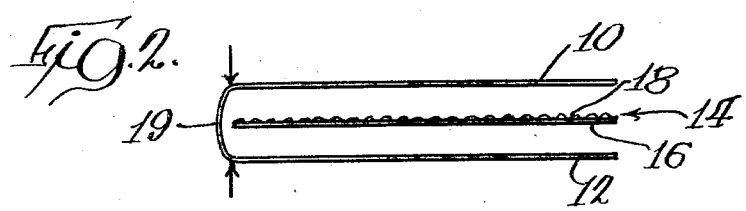
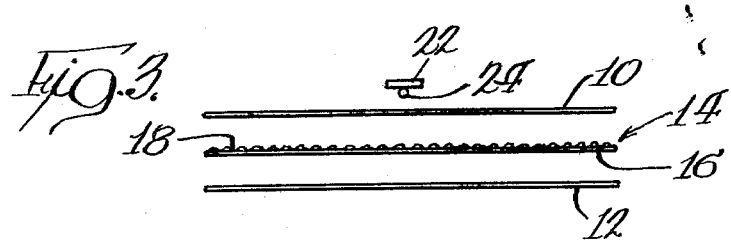
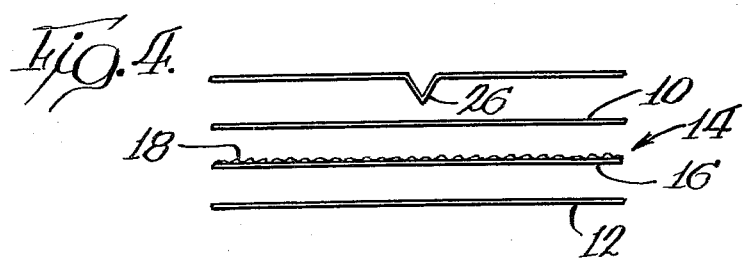

4,224,367

MULTIPLE PLY PACKAGING MATERIAL COMPRISING OUTER PLIES SEALED AROUND AN INNER PLY

BACKGROUND OF THE INVENTION

The present invention relates to multiple ply packaging materials, and in particular to multiple ply packaging materials having exceptionally high gas barrier properties.

Thermoplastic films have gained wide acceptance in the packaging industry, and are commonly employed to package foods in both liquid and solid form. Many thin films composed of polymeric materials, however, while having excellent liquid impermeability characteristics, are highly pervious to oxygen and other gases such as carbon dioxide. A pouch composed of polyethylene, for example, allows relatively rapid penetration of atmospheric oxygen and other gases into the interior thereof, in comparison to containers made of metal or glass.

In the packaging of many food and other products which are sensitive to or reactive with oxygen, it would be desirable to provide a packaging or container material which has the versatility and liquid impermeability of a polymer, and yet has excellent gas barrier properties. The contamination of food products with oxygen after packaging often has many undesirable effects, including discoloration, deterioration and spoilage of the product, as well as significant loss in acceptable shelf storage life.

An exemplary embodiment of a polymer packaging material which has improved gas barrier properties is disclosed in my pending application Ser. No. 597,761, now U.S. Pat. No. 4,105,818. As taught therein, it has been discovered that the provision of certain vinyl and other polymeric films in multiple ply form unexpectedly and significantly increases their gas barrier properties, or decreases their gas permeability, in comparison with a single ply film of the same material and same overall thickness, beyond that expected from thickness considerations alone. Nevertheless, to optimally protect certain products against the detrimental effects of oxygen and/or other gases which may still pass through a polymer film in multiple ply form, it would be extremely desirable to provide a packaging material which exhibits the advantages and versatility of a polymer, and yet has exceptionally great gas barrier properties.

OBJECTS OF THE INVENTION

An object of the present invention is to provide a novel packaging material which has a significantly decreased gas permeability.

Another object of the present invention is to provide such a packaging material which is of multiple ply construction and includes a center ply of high gas impermeability between a pair of outer plies of high liquid impermeability.

A further object of the invention is to provide such a packaging material wherein the outer plies are sealed along their edges to completely seal and encapsulate the center ply therewithin.

SUMMARY OF THE INVENTION

In accordance with the present invention, a packaging material having improved gas barrier properties comprises a pair of plies of thermoplastic material film and a ply of substrate material film arranged in superimposed relationship with the substrate material ply between the thermoplastic material plies and with the thermoplastic material plies being sealed around their edges to sealingly encapsulate the substrate material ply therewithin.

Preferably, to significantly enhance the gas barrier properties of the packaging material the inner ply of substrate material comprises either a metallic material film or a metal coating on a film of plastic substrate material. To protect the inner ply against moisture or liquids which might otherwise cause separation thereof from the outer plies or of the metal coating from the substrate, the outer plies of thermoplastic film are sealed together around their edges to encapsulate the inner ply therebetween. The outer and inner plies may be laminated together, and in one embodiment of the invention the edges of the thermoplastic films extend in superimposed relationship beyond the edge of the inner ply, and are sealed together thereat. In other embodiments, the edges of the thermoplastic films are heat flowed together across the edge of the inner ply, the edges of the thermoplastic films are sealed together by an extrudate, or they are sealed by a strip of thermoplastic film folded therearound and sealingly joined therewith.

In accordance with the method of the invention, a packaging material having improved gas barrier properties is manufactured by arranging in superimposed relationship a pair of plies of thermoplastic film and a ply of substrate material film, with the substrate material ply between the plies of thermoplastic film. The edges of the outer plies of thermoplastic film are then sealed together across the edge of the inner ply to sealingly encapsulate the same therewithin.

In one embodiment of the method, sealing together the edges of the thermoplastic films comprises extending their edges beyond the edge of the inner ply, and then joining together the edges of the thermoplastic films whereat they extend beyond the edge of the inner film. In other embodiments the sealing step comprises applying heat and pressure to the edges of the plies of thermoplastic film sufficient to flow the same together across the edge of the inner film, applying an extrudate to the edges of the thermoplastic films, or positioning a strip of thermoplastic material around the edges of the plies of thermoplastic film and sealing the strip to the films. The method also preferably includes the step of laminating together the superimposed inner and outer plies.

The resulting packaging material is ideally suited to be formed in conventional manners into containers or packages, preferably of the type that may be sealed to exclude air. The thermoplastic material outer plies are highly impervious to oxygen and other atmospheric gases, whereby the container exhibits significantly increased gas barrier properties. In consequence, food or other products packaged in containers made with the packaging material are not subject to contamination with oxygen after packaging, thereby avoiding discoloration, deterioration, spoilage and/or decreased shelf storage life of the products.

Other objects, advantages and features of the invention will become apparent from the following detailed description, taken in conjunction with the accompanying drawings.

BRIEF DESCRIPTION OF THE DRAWINGS

FIG. 1 is an exploded cross sectional side view of a multiple ply gas barrier packaging material in accordance with the teachings of the present invention, illustrating edges of an outer two plies of a thermoplastic material film extended beyond the edge of an inner ply of a substrate material, shown as a metal coated plastic film, for being sealingly joined together to encapsulate the inner ply therewithin;

FIG. 2 is similar to FIG. 1, except that the edges of the plies have initially been formed even, and the edges of the outer plies then flowed together to encapsulate the inner ply therewithin, and FIGS. 3 and 4 illustrate two possible techniques for severing an elongated sheet of the packaging material and for forming along the severed edges of the material an end seal of the type shown in FIG. 2.

DETAILED DESCRIPTION

The multiple ply gas barrier packaging material laminate shown in the drawings includes first and second outer plies, layers, webs or films 10 and 12 of a thermoplastic material positioned on opposite sides of an inner or center ply, layer, web or film of a substrate material indicated generally at 14. The inner ply may comprise a film of nylon or other suitable material such as a metallic foil, and for the embodiment of the invention shown comprises a substrate 16, which may be of a plastic material such as nylon, on one surface of which is coated or otherwise deposited a metal film 18, for example of aluminum. By virtue of the metal film, the inner ply 14 has very significant gas barrier properties, such that the packaging material is characterized by having an oxygen or other gas permeability transmission rate on the order of 0.5 or less, the rate being expressed in terms of cc/100 sq. in. per mil thickness over a twenty-four hour period at one atmosphere pressure and at room temperature, or about 73° F., and 50% relative humidity. This rate is significantly less than the gas permeability transmission rate of two plies of thermosetting material alone.

Although it is preferred that the thermoplastic outer plies 10 and 12 be a polyolefin film or sheet, such as ethylene vinyl acetate, because of its economic availability, other thermoplastic films such as polyvinylidene chloride, sold under the trademark "Saran", polyvinylidene chloride coated or laminated on both sides with polyethylene ("Saranex") and polyamides, for example nylon, may be used. Other suitable thermoplastic films would include biaxially oriented polypropylene, polyvinyl chloride, vinylidene chloride, vinyl chloride, vinyl chloride copolymers, polyacrylonitrile, acrylonitrile-styrene copolymers, polyesters, polyamides, vinyl acetate, cellulose acetate, ethyl cellulose, cellulose triacetate, polystyrene, polyvinyl butyral and polyvinyl acetate, all of which have excellent liquid impermeability and are heat fusible and sealable.

The materials for the inner ply 14 are selected to impart strength, flexibility and a significant gas impermeability to the packaging material laminate. In the case where the inner ply is itself formed of more than one ply, particularly suitable materials for the substrate 16 are nylon, polyester and the other like materials, which are adapted to receive the metal coating 18 of aluminum or other metallic material. The metal coating may be formed on the substrate by any suitable means, for example by sputtering or vapor deposition, or by adhering a metal foil to the substrate. The resulting ply has great toughness, flexibility and excellent oxygen impermeability, and may readily be laminated or otherwise joined with the outer layers of thermoplastic material.

Other suitable materials for the substrate 16 such as craft paper or paperboard may be used, but because of its overall strength, flexibility and workability material of the nylon or polyester variety is preferred.

The plies of thermoplastic and substrate or metal coated substrate materials may be in any range of thickness, although it is normally preferable to use thinner films which are less expensive and easier to handle in packaging applications. The preferred thickness range for each ply is from about 0.5 mil to about 4.5 mils, with about 1 to 3 mils generally being preferred to achieve the desired properties in the final product.

The metal coating 18 on the substrate 16 is highly impermeable to oxygen and other gases, and provides particularly excellent gas barrier properties of the packaging material. Although the coating is shown as being on one side only of the substrate, it is within the contemplation of the invention that a metal coating could be provided on both sides. The resulting ply would have exceptionally low gas transmissibility, since any imperfections in the coating on one side, for example by reason of pinholing, scuffing or striations, would be compensated for by the coating on the other side, it being extremely unlikely that any imperfections in the coatings would be in alignment. In addition, and as stated, a metallic foil or film alone could be used for the inner ply 14 in place of a metal coated substrate, since it would also have excellent gas barrier properties.

The packaging material of the present invention is made of three separate and superimposed plies, which preferably are laminated together by any convenient method, such as by joining or bonding the edges and/or other selected areas of the plies together by the application of heat and pressure or with an adhesive, for example a polyurethane adhesive. The final laminate thus comprises a plurality of superimposed contiguous plies which is easily manipulable in the formation of containers or packages therefrom.

The multiple ply packaging material can be formed in conventional manners into containers or packages, preferably of the type that may be sealed to exclude air. For example, the material may be employed to make bags or pouches having an open end which may be closed by heat or bonding after the contents have been inserted. In the alternative, the bag may be provided with a spout having an air tight cap.

Without further manufacture of the packaging material, the edges of the various plies are raw or exposed. When the packaging is used to make bags or pouches for packaging liquid, if often happens that during the packaging operation the exterior of the bag and the edges of the laminate become wetted. When the inner ply is, for example, of a plastic such as nylon or polyester, which may or may not have a metal coating thereon, a problem arises in that the plastic material is hygroscopic, and when its edge is exposed it acts as a wick to carry the liquid therein. Should this occur, the inner ply may delaminate from the outer plies and/or the metal coating of the ply may delaminate or separate from its substrate, thereby destroying the integrity of the packaging material. In addition, when the inner ply is wetted a considerable amount of its resistance to oxygen permeability is lost.

To prevent wetting of the inner ply in use of the packaging material, in accordance with the teachings of the invention the outer edges of the thermoplastic films 10 and 12 are joined or sealed together to completely and sealingly encapsulate the inner ply 14 therewithin.

The thermoplastic films are highly impermeable to liquid whereby the inner ply is completely protected against being wetted. Thus, potential delamination or separation of the packaging material is prevented.

In the embodiment of the invention shown in FIG. 1 to facilitate sealing of the inner ply 14 within the outer plies of thermoplastic material 10 and 12, the laminate is formed with the edges of the thermoplastic films extending beyond the edges of the inner ply. The edges of the thermoplastic films may then be readily joined and sealed together by the application of heat and pressure, as indicated diagrammatically by the arrows at the left side of the packaging material shown in the drawings. This thus forms a packaging material laminate, the outer surface of which consists entirely of liquid impermeable thermoplastic material. The laminate may thereafter be formed into containers or packages, and when the same are filled with liquid the inner film 14 is protected against wetting.

Another technique for sealing together the edges of the thermoplastic films is shown in FIG. 2. In this case, the edges of all of the plies are aligned and a broad heat seal is applied along the edge of the laminate to melt and extrude or flow the edges of the thermoplastic films together around the edges of the inner film, and to form a thermoplastic material edge seal 19 around the laminate.

FIGS. 3 and 4 illustrate two means for cutting sheets of the multiple ply packaging material in the manufacture of product therefrom, in a manner which simultaneously forms along the cut an edge seal of the type shown in FIG. 2. In FIG. 3, for example, a heated wire 22 centered on a heated sealing bar 24 is used to separate the material, while melting and flowing the cut edges of the thermoplastic films to encapsulate the edges of the inner film, with the sealing bar causing additional extrusion of the adjacent thermoplastic material to enhance the edge seal. FIG. 4 shows a "V" shaped heated cutting element 26 for separating the material, which also extrudes portions of the thermoplastic films adjacent the cut to enhance encapsulation of the inner film. The means illustrated for separating and edge sealing the packaging material are, of course, representative of only two of many possible ways for severing the material while simultaneously forming a seal over the severed edges, and it is understood that the same severing techniques may be used and edge seals obtained with packaging materials formed with inner films of substrates having metallized coatings on both sides thereof, or which consists solely of a metallic foil or film or of an unmetallized substrate such as nylon.

The various means illustrated for forming an edge seal are, of course, not intended to be inclusive. Other suitable techniques include, for example, applying an extrudate, such as of thermoplastic material, over the edges of the material, or wrapping a liquid impermeable strip around the edges of the material and sealing the strip thereto. In the latter case the strip would advantageously be of a thermoplastic material, since after being wrapped around the edges of the packaging material it could readily be sealingly joined therewith by the application of heat and pressure.

In the use of the edge-sealed packaging material to make containers or bags for the packaging of product, edges of the material are overlapped and joined by heat sealing to form the containers. The containers may have an open end or a spout for the introduction of product therein, and after filling the open end is closed or the spout is capped to seal the container. To provide a complete gas barrier for the packaged product, the seal between the overlapping edges of the packaging material is formed between abutting plies of thermoplastic material and within the edges of the encapsulated inner ply, such as within the edges of an encapsulated metal layer. In this manner, a liquid tight container is formed and the inner ply encompasses the entire liquid area of the container, thereby providing a complete liquid and gas barrier for the packaged product.

The resulting container is highly impermeable to both liquid and gas, and provides excellent protection of product therein. The multiple plies of thermoplastic material 10 and 12 are highly impermeable to liquid and, as explained in my aforementioned patent application Ser. No. 597,761, by themselves provide significantly increased gas barrier properties beyond that which might be expected from thickness considerations alone. In addition, the inner ply provides a very substantial gas barrier, and when it includes a metal film effectively reduces the gas transmission rate of the packaging material to less than 10% of that which would be obtained by the two outer plies of thermoplastic material alone. The container thus has excellent liquid and gas barrier properties, so that product therewithin is protected against discoloration, deterioration and spoilage to an extent heretofore unattainable with containers formed solely of thermoplastic materials.

While embodiments of the invention have been described in detail, various modifications and other embodiments thereof may be devised by one skilled in the art without departing from the spirit and the scope of the invention, as defined in the appended claims.

What is claimed is:

1. A multiple ply packaging material having improved gas barrier properties, comprising a pair of plies of thermoplastic film and a ply of a substrate film having a metal coating on at least one surface thereof arranged in superimposed relationship with said metal coated substrate ply positioned between said two plies of thermoplastic film, said thermoplastic films being sealed together around their edges to encapsulate said metal coated substrate therewithin.

2. A multiple ply packaging material as in claim 1, including metal coatings on both surfaces of said substrate film.

3. A multiple ply packaging material as in claim 1, said edges of said thermoplastic films being heat sealed together.

4. A multiple ply packaging material as in claim 1, said plies of thermoplastic and metal coated substrate films being laminated together by heat and pressure.

5. A multiple ply packaging material as in claim 1, said plies of thermoplastic and metal coated substrate films being adhesive laminated together.

6. A multiple ply packaging material as in claim 1, said edges of said thermoplastic films extending in superimposed relationship beyond the edges of said metal coated substrate film and being sealingly connected together thereat.

7. A multiple ply packaging material as in claim 1, said edges of said thermoplastic films being heat flowed together across the edge of said metal coated substrate film.

8. A multiple ply packaging material as in claim 1, including an extrudate of thermoplastic material extending between said edges of said thermoplastic films for sealingly joining said edges together.

9. A multiple ply packaging material as in claim 1, including a strip of thermoplastic material extended around and over said edges of said thermoplastic films and sealingly joined therewith to seal said edges of said thermoplastic films.

10. A packaging material having improved gas barrier properties, comprising a pair of plies of thermoplastic material film and a ply of substrate material arranged in superimposed relationship with said substrate material ply positioned between said thermoplastic material plies, said thermoplastic material plies being sealed around their edges to sealingly encapsulate said substrate material ply therewithin, said substrate material ply being a thermoplastic film selected from the group consisting of nylon and polyester.

11. A packaging material having improved gas barrier properties, comprising a pair of plies of thermoplastic material film and a ply of substrate material arranged in superimposed relationship with said substrate material ply positioned between said thermoplastic material plies, said thermoplastic material plies being sealed around their edges to sealingly encapsulate said substrate material ply therewithin, said substrate material ply comprising a metal coated thermoplastic film selected from the group consisting of nylon and polyester.

* * * * *